(12) United States Patent
Barr et al.

(10) Patent No.: US 10,803,758 B1
(45) Date of Patent: Oct. 13, 2020

(54) WIND PREDICTION SYSTEMS AND METHODS

(71) Applicant: LOCKHEED MARTIN COHERENT TECHNOLOGIES, INC., Louisville, CO (US)

(72) Inventors: Keith S. Barr, Erie, CO (US); Peter G. Wanninger, Berthoud, CO (US); Michael Scott Margulis, Broomfield, CO (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 478 days.

(21) Appl. No.: 15/833,921

(22) Filed: Dec. 6, 2017

Related U.S. Application Data

(60) Provisional application No. 62/437,639, filed on Dec. 21, 2016.

(51) Int. Cl.
| | | |
|---|---|---|
| *G08G 5/00* | (2006.01) | |
| *G01S 17/95* | (2006.01) | |
| *G01S 13/91* | (2006.01) | |
| *G01W 1/10* | (2006.01) | |
| *G01W 1/00* | (2006.01) | |

(52) U.S. Cl.
CPC ............ *G08G 5/0091* (2013.01); *G01S 13/91* (2013.01); *G01S 17/95* (2013.01); *G01W 1/10* (2013.01); *G08G 5/0013* (2013.01); *G08G 5/0039* (2013.01); *G01W 2001/003* (2013.01); *G01W 2001/006* (2013.01)

(58) Field of Classification Search
None
See application file for complete search history.

(56) References Cited

U.S. PATENT DOCUMENTS

| | | | | |
|---|---|---|---|---|
| 2013/0013182 | A1* | 1/2013 | Bertsimas | G06Q 10/04 701/120 |
| 2015/0247953 | A1* | 9/2015 | O'Brien | G01S 7/4817 702/3 |
| 2016/0004969 | A1* | 1/2016 | Cetinich | G06N 20/00 706/11 |
| 2016/0210868 | A1* | 7/2016 | Donovan | G08G 5/0065 |
| 2018/0062393 | A1* | 3/2018 | Bou-Zeid | G01P 5/14 |

* cited by examiner

*Primary Examiner* — Gregory J Toatley, Jr.
*Assistant Examiner* — Terence E Stifter, Jr.
(74) *Attorney, Agent, or Firm* — Morgan, Lewis & Bockius LLP

(57) ABSTRACT

A wind prediction system is provided that can be implemented in an air-traffic decision tool or a wind turbine system. An air-traffic decision tool may incorporate a wind prediction system to generate prevailing wind direction predictions and determine a time at which to re-configure runway directions. A wind turbine system may incorporate a wind prediction system to predict power output of a wind turbine.

20 Claims, 4 Drawing Sheets

WIND PREDICTION SYSTEMS AND METHODS

CROSS-REFERENCES TO RELATED APPLICATIONS

This application claims priority to and the benefit of U.S. Provisional Patent Application No. 62/437,639, filed Dec. 21, 2016, which is hereby incorporated by reference in its entirety.

STATEMENT REGARDING FEDERALLY SPONSORED RESEARCH OR DEVELOPMENT

Not applicable.

FIELD

The disclosure relates in general to wind prediction systems, and in particular to, for example, without limitation, wind prediction for air traffic control systems.

BACKGROUND

The description provided in the background section, including without limitation, any problems, features, solutions or information, should not be assumed to be prior art merely because it is mentioned in or associated with the background section. The background section may include information that describes one or more aspects of the subject technology.

Tailwinds are hazardous to aircraft landing at airports because tailwinds increase the ground speed of aircraft at touchdown, thereby increasing the distance required for aircraft to come to a stop. Even moderate tailwinds can increase the ground speed at touchdown enough to make it difficult to stop a commercial aircraft before reaching the end of the runway. To mitigate the tailwind hazard, Air Traffic Management (ATM) at commercial airports configures runway use so that aircraft do not approach the runway from a direction that would cause the aircraft to experience a significant tailwind.

When the wind direction changes, ATM must make a subjective decision to re-configure runway use at an appropriate time to direct aircraft to approach from a new direction that avoids touchdowns with tailwinds. However, ATM currently does not know in advance when and by how much wind directions will change. As a result, re-configuration of runway use occurs after the wind direction has changed, and re-configuration of runway use significantly disrupts air traffic flow, resulting in a period during which no aircraft are touching down while air traffic control diverts the flight paths of aircraft to new approach directions. Periods when no aircraft are touching down have significant adverse impacts on airport revenue, flight delays, and airline costs. In addition, to accommodate periods when no aircraft are touching down, air traffic control must manage the added danger of disrupted aircraft flow, directing aircraft to perform holding maneuvers such as dog-legs, S-turns, and pre-defined holding patterns while they establish a new primary approach path and direction.

The wind energy industry also requires accurate forecasts of wind speeds at the locations of turbines and forecasts of wind turbine power output. In the past, the industry has employed numerical weather models to predict future wind speeds. However, wind speed errors associated with these models are typically large since the models attempt to derive wind speeds from coarsely sampled atmospheric information.

SUMMARY

The description in this summary section may provide some illustrative examples of the disclosure. This section is not intended to be a broad overview or to identify essential elements of the disclosure.

In accordance with some aspects of the subject disclosure, a decision aid tool for ATM providing early warning of wind direction changes is provided. The decision aid tool enables advanced planning for wind direction and/or windspeed changes and facilitates reconfiguration of runway use before the reconfiguration becomes critical for safety. Modeling indicates that a wind forecast thirty minutes in advance of the wind change can significantly reduce or even completely eliminate periods when no aircraft are touching down due to the reconfiguration. Reducing or eliminating periods when no aircraft are touching down due to tail-wind related reconfiguration may have substantial financial benefits for airports and airlines, and significant safety benefits for airplanes and air traffic control systems.

In accordance with other aspects of the subject disclosure, a wind speed prediction tool is provided that derives the future wind speed at a turbine location and future wind turbine output power from a 3-D wind field sampled with arbitrary resolution and repetition in the three spatial dimensions and in time. For example, wind speed and direction measurements may be sampled with a particular spatial and temporal spacing in a region of the atmosphere of a particular size and shape. The wind speed prediction tool determines which of these wind speed and direction measurements will impact the wind speed in a volume of interest at future times, and calculates a most likely average wind speed in the volume of interest at future times. From this forecast of the future wind speed, the wind speed prediction tool then further calculates the future output power of a wind turbine in the volume of interest and/or to order conventional power generation when wind is predicted to be inadequate.

Various embodiments may be useful in, for example, wind energy applications and related information technology, advanced sensors or advanced software.

Various embodiments may be useful in, for example, aviation decision aid tools, and airport runway reconfiguration tools.

Various embodiments disclosed herein relate to wind forecasting, power forecasting, wind energy, and wind integration.

Various embodiments disclosed herein relate to data analytics.

In one or more implementations, a system is provided that includes at least one wind sensor configured to sample wind vectors for a plurality of parcels of air within a volume at a measurement time. The system also includes at least one processor configured to propagate the sampled wind vectors for each of the plurality of parcels of air from the measurement time to a prediction time. The at least one processor is also configured to identify a subset of the propagated wind vectors that are within a region of interest associated with an airport runway at the prediction time. The at least one processor is also configured to combine the subset of propagated wind vectors to determine a predicted prevailing wind vector in the region of interest at the prediction time. The at least one processor is also configured to identify a new runway configuration based on the predicted prevailing wind vector. The at least one processor is also configured to obtain aircraft data associated with at least one aircraft approaching the airport runway. The at least one processor is also configured to generate a runway reconfiguration command for reconfiguration of the airport runway from a current runway configuration to the new runway configuration at a reconfiguration time that is based on the obtained aircraft data.

In one or more implementations, a method is provided that includes obtaining wind vector samples for a plurality of parcels of air at a measurement time. The method also includes propagating the sampled wind vectors for each of the plurality of parcels of air from the measurement time to a prediction time. The method also includes identifying a subset of the propagated wind vectors that are within a region of interest associated with an airport runway at the prediction time. The method also includes combining the subset of propagated wind vectors to determine a predicted prevailing wind vector in the region of interest at the prediction time. The method also includes identifying a new runway configuration based on the predicted prevailing wind vector. The method also includes obtaining aircraft data associated with at least one aircraft approaching the airport runway. The method also includes generating a runway reconfiguration command for reconfiguration of the airport runway from a current runway configuration to the new runway configuration at a reconfiguration time that is based on the obtained aircraft data.

In one or more implementations, a system is provided that includes a lidar sensor configured to sample wind vectors for a plurality of parcels of air within a volume. The system also includes computing equipment configured to receive the sampled wind vectors from the lidar sensor. The computing equipment is also configured to propagate the sampled wind vectors forward in time. The computing equipment is also configured to identify a subset of the propagated wind vectors that intercept a region of interest. The computing equipment is also configured to identify an arrival time at the region of interest for each of the subset of propagated wind vectors. The computing equipment is also configured to bin the subset of the propagated wind vectors based on the identified arrival times. The computing equipment is also configured to identify a prevailing wind vector for the region of interest for each bin of the binned subset of the propagated wind vectors, based on the propagated wind vectors in that bin.

It is to be understood that both the foregoing general description and the following detailed description are exemplary and explanatory and are intended to provide further explanation of the subject technology as claimed. It is also to be understood that other aspects may be utilized and changes may be made without departing from the scope of the subject technology.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

It is understood that various configurations of the subject technology will become readily apparent to those skilled in the art from the disclosure, wherein various configurations of the subject technology are shown and described by way of illustration. As will be realized, the subject technology is capable of other and different configurations and its several details are capable of modification in various other respects, all without departing from the scope of the subject technology. Accordingly, the summary, drawings and detailed description are to be regarded as illustrative in nature and not as restrictive.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

Wind prediction systems are disclosed herein that can be embedded in, or coupled to, larger systems such as air traffic management (ATM) systems and/or wind turbine systems. The wind prediction system collects measured wind vectors for various parcels of air in a volume and propagates the sampled vectors forward in time, using an advection model, to generate a predicted prevailing wind vector in a region of interest (ROI) within or near the volume of air.

Various examples are described herein in which a wind prediction system provides wind forecasts for a region of interest associated with one or more runway systems at an airport. In these examples, the wind forecasts are provided to ATM systems to enable ATM systems to know in advance when and by how much wind directions will change at an airport. The wind prediction system applies forecasts of wind speed and direction in the near future (e.g., from the present to 30 minutes or 60 minutes in the future in one to five minute increments) to identify an optimal or convenient time to reconfigure runway use to minimize financial impacts and safety concerns associated with the reconfiguration (e.g., based additionally on known or obtained data regarding approaching aircraft).

Figure 1:
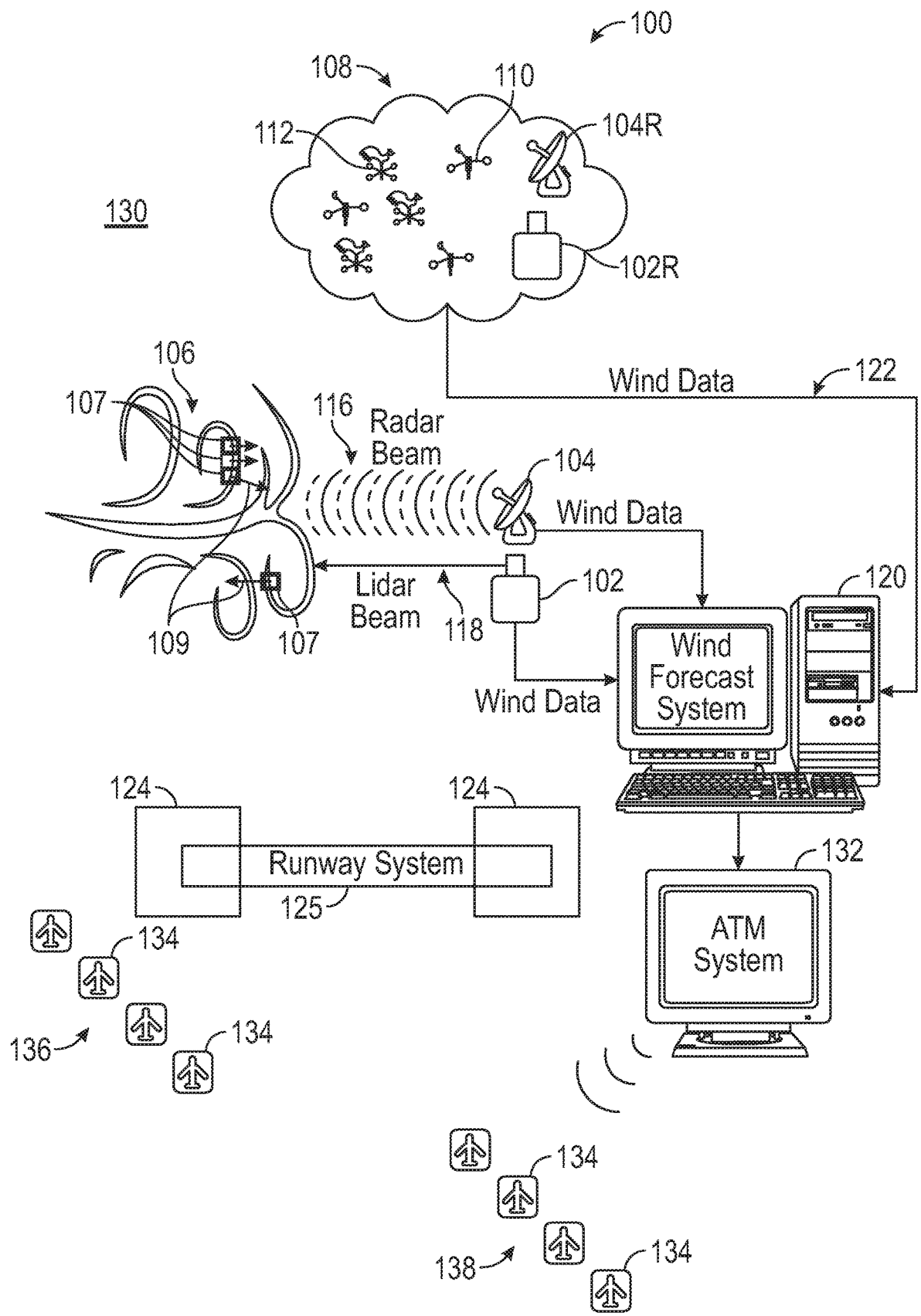
FIG. 1 illustrates a schematic diagram of an example of a system that includes a wind-prediction system in accordance with certain aspects of the disclosure.

FIG. 1 shows an example of a wind prediction system associated with an air traffic management (ATM) system. As shown in FIG. 1, a wind prediction system 100 includes one or more wind sensors such as Lidar sensor 102 and radar sensor 104, coupled to computing equipment 120 (e.g., via wired or wireless connections) to form a wind forecast system. Wind data 122 from sensors 102 and 104, and/or other sensors 108 such as anemometers 110, vanes 112, additional remote Lidar sensors 102R, additional remote radar sensors 104R, sodars, etc., is provided to computing equipment 120. A position, speed and/or a direction of several parcels 107 of wind 106 in a volume 130 can be determined based on sensor data from sensors 102, 104, 102R, 104R, 110, and/or 112. Wind data 122 may include raw data from the sensors and/or processed data generated at the sensor. Processed data may include a position, speed and/or a direction of several sampled parcels 107.

Lidar sensor 102 transmits Lidar beam 118 (e.g., a pulsed laser beam such as a pulsed infrared laser beam) that is reflected by aerosol particles in the air itself (e.g. dust, pollution, and/or other particulates entrained in the air). Lidar sensor 102 may be, for example, a Lockheed Martin WindTracer® lidar product. When the air moves to generate wind 106, a Doppler shift in the reflected portion of Lidar beam 118 is detected by wind forecast system 100 (e.g., at sensor 102 or at computing equipment 120). By scanning Lidar beam 118 and/or one or more additional Lidar beams, the speed and direction (e.g., encompassed in a wind vector 109) of each of various parcels 107 of wind 106 within volume 130 can be sampled.

Similarly, radar sensor 104 transmits radar beam 116 which is reflected by, for example, moisture in wind 106, the motion of which causes a Doppler shift in the reflected radar signal. Radar sensor 104 and/or wind forecast system 120 determines a speed of the wind at the reflected location based on the Doppler shift of the radar beam (e.g., alone or in combination with the Lidar data). By scanning radar beam 116 and/or one or more additional radar beams, one or more additional wind vectors 109 including the speed and direction of each of various parcels 107 of wind 106 within volume 130 can be sampled.

Lidar sensor 102 and radar sensor 104 can be operated separately (e.g., in different atmospheric conditions) and/or together to provide complementary and/or combined wind vector samples for various parcels within volume 130. Because the laser Lidar beam 118 is localized with respect to radar beam 104, Lidar sensor 102 can provide samples of parcels of air that are smaller than would be sampled by a radar sensor alone. For example, Lidar sensor 102 may be able to measure smaller parcels of air because Lidar beam 118 doesn't spread as much as an RF beam such as beam 116 from radar sensor 104 (e.g., even with a narrow beam radar). Narrow beam radar may have about 1.5 degrees of divergence, whereas the lidar beam may have nearly zero divergence.

Once a wind vector 109 for each parcel 107 is identified by wind forecast system 120, each parcel 107 is propagated forward in time based on the associated wind vector 109. At a desired prediction time, propagated parcels 107 that are within one or more regions of interest (ROIs) 124 are used by wind forecast system 120 to predict a single prevailing wind vector in the ROI at the prediction time. This process of predicting wind vectors for each ROI 124 can be repeated for multiple prediction times to predict wind changes within each ROI 124.

Although FIG. 1 depicts a two-dimensional representation of wind 106, volume 130, parcels 107, and ROIs 124, it should be appreciated that each of these represents a three-dimensional element in real world applications. Because a Lidar sensor 102 can scan and sense winds over a larger volume of air than a fixed anemometer or vane sensor or an azimuthally rotating radar sensor, Lidar sensor 102 may help obtain samples of wind vectors 109 for parcels 107 higher above the ground (e.g., up to five kilometers), thus increasing the vertical height of volume 130 above the ground.

In the example of FIG. 1, only four parcels 107 are shown for clarity. However, it should be appreciated that Lidar beam 118 and/or radar beam 116 can sample any desired number of contiguous or sparsely distributed parcels 107. For example, a lidar scan performed with Lidar sensor 102 may consist of 180 to 360 lines of sight, each with 100 to 128 range gates, giving 18,000 to 46,000 measurements from each scan.

In the example of FIG. 1, ROIs 124 are volumes of air located around the ends of runway system 125 for an airport. Wind forecast system 120 is communicatively coupled to air traffic management system 132. Air traffic management system 132 controls take-offs and landings of aircraft such as approaching aircraft 134 using runway system 125 based on predicted winds, runway configuration or reconfiguration commands, or other input provided by wind forecast system 120. FIG. 1 shows a first group 136 of aircraft 134 approaching a first side of runway system 125 and a second group 138 of aircraft approaching a second side of runway system 125. In this example, aircraft 134 of group 136 are scheduled to arrive before a reconfiguration time for runway 125 and aircraft 134 of group 138 are scheduled to arrive after the reconfiguration time. The reconfiguration time is determined by wind forecast system 120 based on predictions of prevailing winds in one or more ROIs 124 at various future prediction times as described in further detail hereinafter. Group 138 has been redirected to the second side of runway 125, by ATM 132 providing an updated landing pattern, after identification of the reconfiguration time and comparison of their arrival times (e.g., by system 120).

In certain aspects, either of wind forecast system 120 and ATM system 132 may be implemented using software, hardware or a combination of software and hardware, either in a dedicated server, or integrated into another entity, or distributed across multiple entities.

Wind forecast system 120 and/or ATM system 132 may include a bus or other communication mechanism for communicating information, and one or more processors coupled with the bus for processing information such as wind data 122 and/or aircraft data associated with aircraft 134. By way of example, wind forecast system 120 and/or ATM system 132 may be implemented with one or more processors such as a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Wind forecast system 120 and ATM system 132 can include, in addition to hardware, code that creates an execution environment for wind prediction and/or air traffic management based on predicted winds, e.g., code that constitutes processor firmware, a protocol stack, a database management system, an operating system, or a combination of one or more of them stored in an included memory, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device for storing information and instructions to be executed by the one or more processors. The processor(s) and/or the memory can be supplemented by, or incorporated in, special purpose logic circuitry.

The instructions may be stored in the memory and implemented in one or more computer program products, i.e., one or more modules of computer program instructions encoded on a non-transitory computer readable medium for execution by, or to control the operation of, the processor(s), and according to any method well known to those of skill in the art.

The instructions that generate wind predictions and runway reconfiguration times may be based on fixed rules for wind and aircraft analysis or may be based on neural network, machine learning, or artificial intelligence approaches that optimize ATM operations against performance metrics such as minimized flight delays or airline costs, or maximized airport revenues.

In order to identify and communicate a reconfiguration time at which to reconfigure runway use, wind forecast system 120 may perform one or more of the following operations: (i) ingesting wind vectors such as wind vectors 109 generated from one or more external sources such as one or more of the sensors of FIG. 1 in real-time; (ii) propagating the wind vectors forward in time to a produce a wind forecast in a region of interest 124; (iii) deriving a single prevailing wind vector in the region of interest 124 (e.g., at the airport) from the wind forecast; (iv) performing trend analysis to determine when, how quickly, and how much the prevailing wind vector in the ROI is changing and is expected to change; (v) deciding what magnitude of wind vector change requires runway re-configuration action by the Air Traffic Manager (e.g., using a database such as a lookup table that relates winds to runway configurations); (vi) identifying an optimal or desired time to advise the Air Traffic Manager to change the runway configuration (e.g., based in part on predicted winds and data associated with approaching and/or departing aircraft); (vii) communicating to the Air Traffic Manager system 132 (e.g., to a Graphical User Interface (GUI) of the ATM), the reconfiguration time at which to change the runway configuration; and (viii) providing visualization of the wind vector field around the airport to provide the Air Traffic Manager with situational awareness of the wind conditions.

Wind forecast system 120 may combine numerical weather modeling, momentum transport modeling, and sensor inputs from remote sensors (e.g., lidars 102, radars 104, sodars, etc.) and/or in-situ sensors (e.g., anemometers 110 and wind vanes 112).

For example, one or more lidar sensors 102 such WindTracer® systems and/or other sensors may collect finely sampled wind measurements over large spatial areas (e.g., volume 130) in real-time, producing 3-D wind fields (e.g., fields of vectors 109) that can be used to produce highly accurate forecasts of future wind speeds at various locations such as ROIs 124 at or near a runway 125. These forecasts are highly accurate because they are based on detailed measurements of wind speeds and directions across large volumes in the vicinity of the runway.

A future wind speed and/or direction forecast may then be derived from a 3-D wind field, sampled with a desired resolution and repetition in the three spatial dimensions and in time. More specifically, some exemplary Lidar systems such as WindTracer® systems can generate wind vectors 109 sampled with a spatial resolution of approximately 100 meters (e.g., for parcels 107 corresponding to angular slices of an annular section of air, each angular slice spanning 100-500 meters in width, depending on the radial distance from the sensor at which the angular slice is taken) within a disk shaped volume of air approximately 15 km in radius and extending from the ground to about 5 km altitude. These wind vectors 109 may be advected forward in time to produce estimates of future winds at one or more ROIs within or near the volume.

Advection forward in time may be performed by applying principles of momentum transport physics to air in volume 130, the air acting as an incompressible fluid for applications considered in this disclosure. For example, a set of vectors 109 representing the speed and direction of the wind in a region 130 of the atmosphere of a desired size and shape and sampled with desired spatial and temporal resolution may be generated. Each wind vector 109 may be assigned to represent a small parcel 107 of air moving with a single speed and in a single direction represented by the wind vector 109 at the location of that parcel 107. Each small parcel 107 of air may be propagated forward in time by a desired forecast time horizon to one or more prediction times.

The propagation of vectors 109 is performed by moving the parcel of air in the direction and at the speed of the wind vector 109 for the desired forecast time horizon. This propagation step may be repeated for every small parcel 107 of air represented by a wind vector 109. This propagation rearranges the small air parcels 107 along with their representative wind vectors 109 into a new field of wind vectors. Because air is an incompressible fluid for the applications considered in this disclosure, this rearrangement of air parcels 107 represents, to a high degree of accuracy, the new wind field while conserving both the total mass and total momentum of the original volume of air.

After propagating each of the individual small parcels of air forward by the desired time horizon, a wind speed and wind direction time series may be generated for specified analysis volumes (e.g., ROIs 124) for which wind prediction is desired (such as a wind farm or airport). Analysis of the time series can be used to predict the rate and magnitude of wind changes and to make decisions about future operations of other technological systems which may be affected by winds such systems of approaching aircraft at an airport or wind farm operations.

Because the future wind speed and/or direction forecasts are based on finely sampled wind measurements to derive the future wind state, the forecasts are more accurate than numerical weather models that rely on coarsely sampled measurements of atmospheric parameters (e.g., atmospheric temperature, pressure, humidity, and weather front geometry) and in some cases extremely coarsely sampled wind measurements (e.g., single point measurements from anemometers or vertical wind profilers). As noted, forecasts of wind speeds and/or directions may be made based on a simple physical principle—conservation of momentum in an incompressible fluid—and thereby avoid the computational complexity of advection calculations often used in numerical weather models. The avoidance of computational complexity enables forecasts to be generated with great computing speed, enabling real-time derivation of the future wind state from current measurements of the 3-D wind field.

Figure 2:
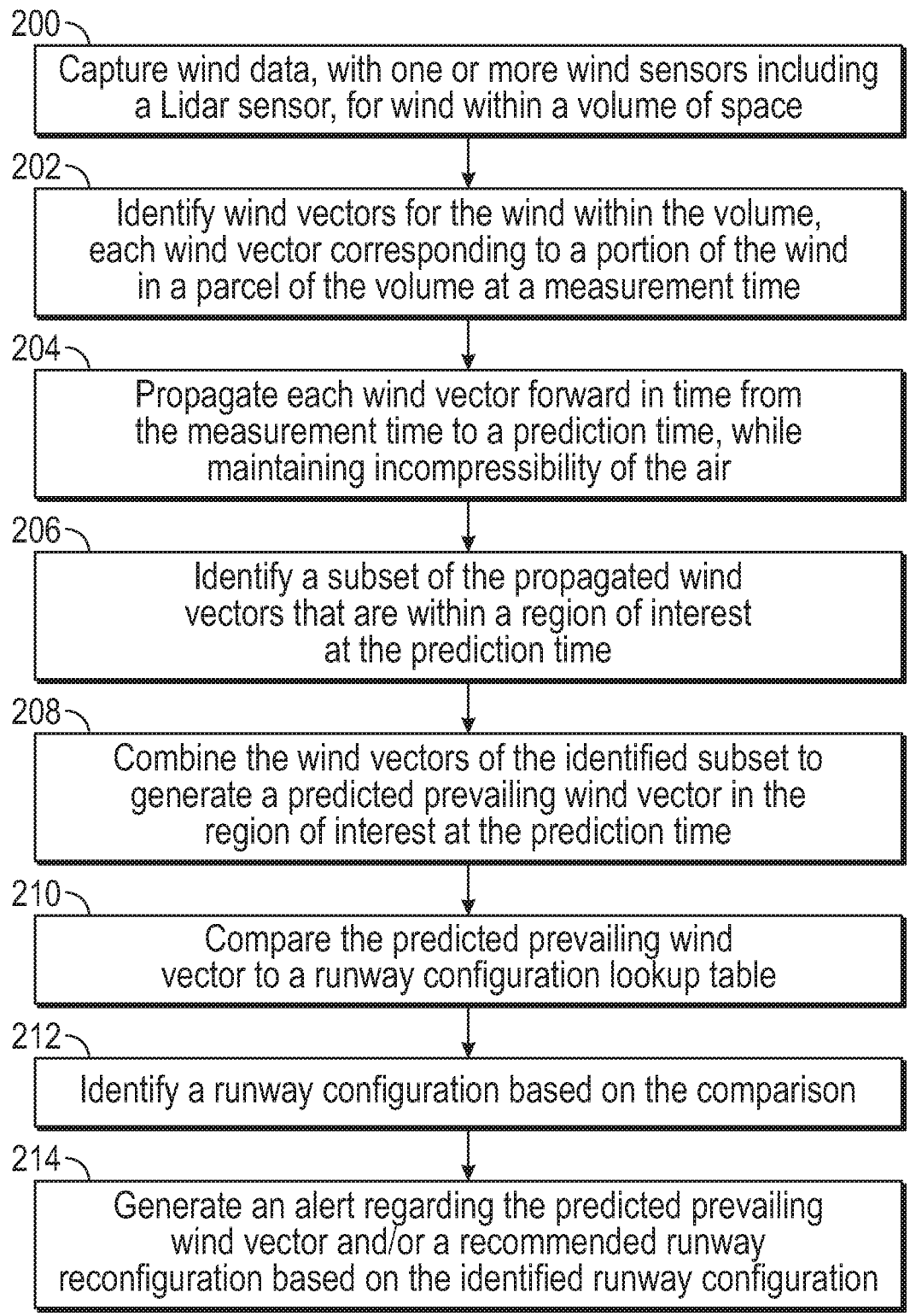
FIG. 2 is a flow chart showing an illustrative process for air traffic management using a wind prediction system in accordance with certain aspects of the disclosure.

Illustrative operations that may be performed for wind prediction and air traffic management based on predicted winds are shown in FIG. 2.

At block 200, a wind prediction system such as wind prediction system 100 of FIG. 1 captures wind data such as wind data 122, with one or more wind sensors (e.g., a lidar sensor 102, a radar sensor 104, and/or other wind sensors as described herein) for wind such as wind 106 within a volume of space such as volume 130. The wind data may be processed at the sensor and/or at computing equipment 120 for each of several parcels of air such as parcels 107 of FIG. 1.

At block 202, wind vectors such as wind vectors 109 are identified for the wind within the volume, each wind vector corresponding to a portion of the wind in a parcel 107 of the volume at a measurement time.

At block 204, each wind vector is propagated forward in time from the measurement time to a prediction time, while maintaining incompressibility of the air. Each wind vector may also be propagated forward in time from the measurement time to multiple additional prediction times (e.g., prediction times spaced apart in one-minute or five-minute (or other) increments and extending thirty, sixty, ninety, or more than ninety minutes from the current time and/or the measurement time). At least some of the prediction times may be future times that have not yet occurred.

At block 206, a subset of the propagated wind vectors that are within a region of interest such as one of ROIs 124 of FIG. 1 at the prediction time are identified.

At block 208, the wind vectors of the identified subset are combined (e.g., by computing an average, a weighted average, a median, or another combination of the wind vectors in the identified subset) to generate a predicted prevailing wind vector in the region of interest at the prediction time.

At block 210, for airport applications such as in the example of FIG. 1, the predicted prevailing wind vector is compared to a plurality of runway configurations in a runway configuration lookup table or equivalent database.

At block 212, a runway configuration for the predicted prevailing wind at the prediction time is identified based on the comparison.

At block 214, an alert regarding the predicted prevailing wind vector and/or a recommended runway reconfiguration may be generated based on the identified runway configuration. The alert may be provided on an air traffic management system such as ATM system 132 of FIG. 1, which may, in turn, provide updated arrival route instructions to one or more incoming aircraft and/or updated departure instructions for one or more outgoing aircraft. The flight path or landing pattern of one or more incoming aircraft, already in the air, may be altered based on the alert from the ATM system.

Figure 3:
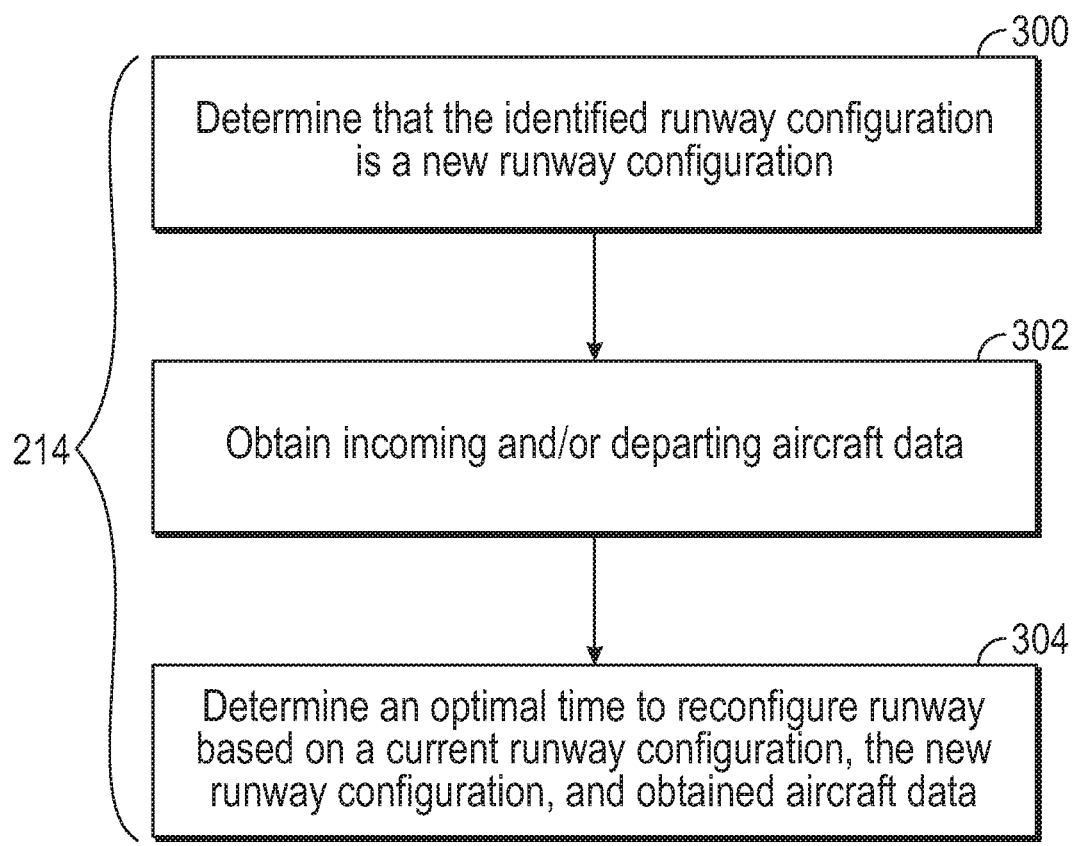
FIG. 3 is a flow chart showing an illustrative process for generating a recommended runway reconfiguration in accordance with certain aspects of the disclosure.

Illustrative operations that may be performed for generating an alert regarding the predicted prevailing wind vector and/or a recommended runway reconfiguration based on the identified runway configuration as in block 214 of FIG. 2, are shown in FIG. 3.

At block 300, computing equipment 120 may determine that the identified runway configuration is a new runway configuration (i.e., that the identified runway configuration is different from the current runway configuration). For example, the new runway configuration may have a landing pattern in a direction that is opposite to the direction of the landing pattern in the current runway configuration (e.g., to avoid aircraft landing at the prediction time from experiencing a tailwind).

At block 302, incoming and/or departing aircraft data may be obtained by computing equipment 120. The aircraft data may include positions, scheduled landing times, landing speeds, and landing directions for incoming aircraft and/or scheduled liftoff times, liftoff speeds, and liftoff directions for outgoing aircraft. The aircraft data may also include flight tracks (e.g., three dimensional flight positions as a function of time).

At block 304, a desired (e.g., optimal) time to reconfigure a runway is determined based on the current runway configuration, the new runway configuration, and obtained aircraft data. For example, the reconfiguration time may be a time that reduces or minimizes air traffic disruptions while ensuring or increasing take-off or landing safety for a particular predicted wind.

Figure 4:
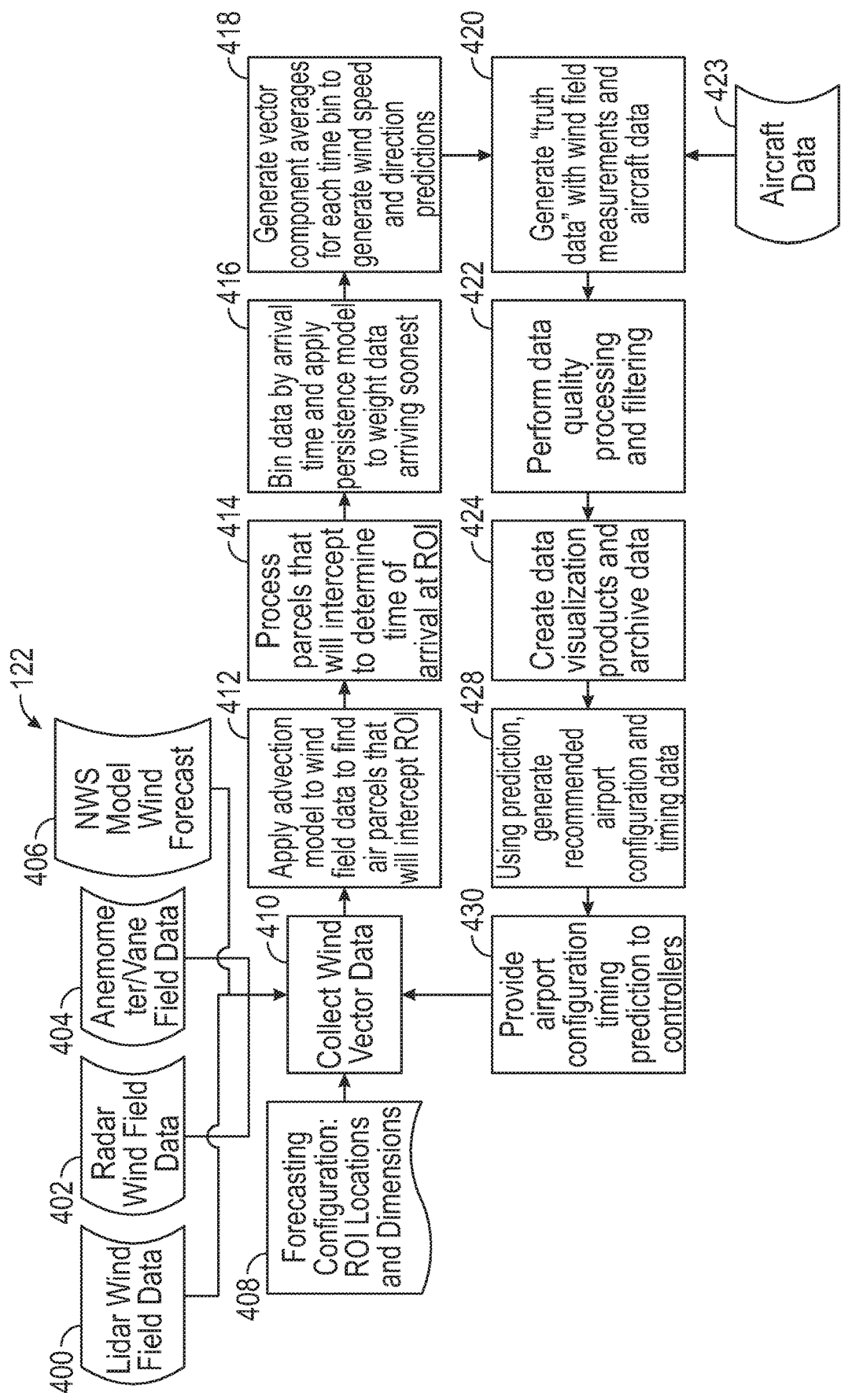
FIG. 4 is another flow chart showing an illustrative process for air traffic management using a wind prediction system in accordance with certain aspects of the disclosure.

FIG. 4 shows a more detailed flow diagram of illustrative operations that may be performed for wind prediction and air traffic management based on predicted winds. As shown in FIG. 4, at block 410 wind vector data 122 may be collected (e.g., by wind forecast system 120) for a volume of air. As shown, the wind vector data may include lidar wind field data 400, radar wind field data 402, anemometer/vane field data 404, other sensor data such as sodar data, and/or model wind forecasts from external sources such as the National Weather Service (NWS) provided wind model forecast(s) 406. Any or all of data 400, data 402, data 404, and data 406 may include one or more wind vectors 109 each associated with a parcel 107 of air in a volume 130, and/or wind vectors 109 may be derived from the wind data.

As shown in FIG. 4, at block 410, a forecasting configuration 408 may also be obtained. Forecasting configuration 408 may include locations and dimensions of one or more regions of interest (ROIs) such as ROIs 124 at or near the volume of air in which the wind vector data is obtained.

At block 412, an advection model may be applied to the wind field data to find air parcels such as air parcels 107 that will intercept each ROI (e.g., air parcels that, after propagation are at least partially within the ROI at any time during the propagation, such as at any of several prediction times). Applying the advection model may include propagating the position of each parcel 107 at the speed and in the direction described by the wind vector 109 for that parcel, from the measurement time to one or more desired prediction times (e.g., based on a model that states that every parcel of air will maintain the same direction and speed as that measured and indicated by the wind vector for that parcel).

At block 414, parcels 107 that will intercept the ROI are processed to determine a time of arrival at ROI. Parcels 107 that intercept the ROI are parcels that will be located at least partially within the ROI at any of the desired prediction times in a model run.

At block 416, wind vectors 109 that have been propagated may be binned by arrival time (e.g., in one-minute, sub-minute, three-minute, five-minute, ten-minute, or other bin widths). The wind vectors in each time bin are then combined (e.g., averaged) at block 418 to determine a prevailing wind vector at the ROI for that time bin. If desired, a persistence model may also be applied in which each new set of predicted wind vectors is averaged or otherwise combined with future wind predictions. In this way, the current wind condition is used to weight predictions for future wind conditions.

For example, when determining the predicted prevailing wind for a first-time bin, only the wind vectors 109 in that time bin are combined. These wind vectors in the first-time bin may be actual measured wind vectors or first predicted wind vectors. In next time bin, when the persistence model is applied, wind vectors with arrival times at the ROI within that time bin and the wind vectors for the first-time bin are included (e.g., vector component averaged) to generate a single predicted prevailing wind vector for that time bin at block 418. In this way, the persistence model applied at block 416 causes wind vectors 109 arriving at the ROI soonest to be weighted most heavily in determining the predicted prevailing wind vector at block 418.

At block 420, "truth data" may be generated using wind field measurements (including current airport METAR data) and aircraft data. For example, a "truth value" for the wind in a ROI may be set as the measured wind vector at the center of the ROI at the current time. As shown in FIG. 4, at block 420, aircraft data 423 such as data indicating positions, velocities, flight paths, arrival times, departure times, and/or other information associated with arriving aircraft 134 and/or departing aircraft may also be obtained (e.g., from an ADS-B receiver, an airport or ATM database, or data service). The "truth data" may also include some or all the aircraft data (e.g., actual landing patterns or directions for one or more approaching aircraft).

Aircraft data 423 may also include runway configuration data such as a lookup table of runway configurations for various prevailing wind vectors at or near one or more ends of a runway for later use.

At block 422, data quality processing and filtering is performed to apply the "truth data" to the predicted data to enhance the accuracy of the predicted prevailing winds. For example, "truth data" of a currently measured wind vector at a current time may be compared with a previously predicted wind vector for the current time. As another example, "truth data" of actual landing directions for one or more approaching aircraft at a current time may be compared with previously recommended landing directions for those approaching aircraft based on previous wind predictions.

At block 424, data visualization products may be created, and prediction data may be archived. Data visualization products may include controllable maps of wind fields spanning a window of time extending forward (future) and backward (past) from the current time. The future portion of the controllable maps show predicted wind fields and the past portion may show both previously predicted wind fields along with actual measured wind fields at those times. The controllable maps may include, for example, a slider or other user-accessible control mechanism with which the user can evolve a wind-field map forward and backward in time.

At block 428, a recommended configuration (or reconfiguration) and timing data including a reconfiguration time for reconfiguring one or more runways may be generated using the predicted prevailing winds, the runway configuration database (e.g., a lookup table of configurations for each of several winds as defined by, for example, the Federal Aviation Administration), and the aircraft information.

At block 430, the runway (airport) reconfiguration timing prediction and/or recommendation may be provided to controllers (e.g., via ATM system 132). In comparison with conventional weather prediction systems, the wind prediction systems disclosed herein provide a high spatial resolution prediction and a timing of a predicted wind change, along with an associated recommendation of a reconfiguration time for a runway to provide a new tool to improve the existing technology of air traffic management.

Wind prediction systems as described herein provide a novel tool that forecasts the future wind state from the current wind state, derives prevailing wind vectors consistent with the current and future wind states, and performs trend analysis on the changes in the prevailing wind vectors to generate actionable commands for an Air Traffic Manager. The provided tool is an artificial intelligence tool that facilitates runway reconfigurations based on future wind change predictions rather that solely on wind changes that have already occurred. The wind prediction system ingests and processes a much more complete set of wind data than an Air Traffic Manager has or could comprehend, and then replaces the current subjective occurred-wind-change decision process with an objective repeatable prediction process to make the best decision on when to reconfigure runway use. Because the provided tool is automated and runs continually, it also frees the Air Traffic Manager system to focus on other tasks.

In addition to the wind prediction system itself, which may be implemented by a set of algorithms captured in software instructions or code executed by one or more processors as described herein, an additional architecture surrounding the wind prediction system may also be provided. The additional architecture disclosed herein may leverage the benefits of the systems and methods disclosed above that (1) measure appropriate weather parameters in real-time (such as wind vectors measured by WindTracer®); (2) ingest weather parameters into wind forecasting model; (3) derive current and future prevailing winds; and (4) execute an artificial intelligence algorithm on prevailing wind data to decide when to reconfigure runway use, and communicate this information to an Air Traffic Manager; to achieve additional benefits such as (A) based on runway re-configuration timing information, reconfiguring aircraft flight vectors to minimize aircraft time in flight and optimize air traffic throughput at the airport; (B) derive from (A) the benefits of optimized air traffic which can also provide: (Aa) added airport revenue derived from fees charged by airport to airlines due to increased airport throughput, (Ab) added concession revenue at the airport due to increased passenger traffic through the airport, (Ac) added airport parking revenue due to increased passenger traffic at the airport, (Ad) added airport revenue due to per-passenger or per-aircraft-weight surcharge for reduced delays, (Ae) reduced airline fuel costs due to reduced aircraft time of flight, (Af) reduced airline flight crew costs due to reduced aircraft time of flight, (Ag) reduced aircraft maintenance and financing costs due to reduced aircraft time of flight, (Ah) reduced delays for passengers and cargo, and (Ai) safer air travel because air traffic controllers have increased time to re-vector aircraft to new runway approaches; (C) fund the operation of the wind prediction system from either (Ba) the financial benefit derived from wind prediction system as described above, (Bb) a per-passenger surcharge, and/or (Bc) a surcharge on aircraft gross weight; and (D) apply feedback from measured air traffic efficiency improvements to optimize the wind prediction tool and its use.

Accordingly, the additional architecture surrounding the wind prediction system can include a business architecture in which a benefit is derived from an artificial intelligence tool that (a) converts weather data into actionable intelligence for the Air Traffic Manager, (b) generates financial benefit from increased air traffic throughput at the airport and reduced aircraft time of flight, (c) generates a logistical benefit for passengers and cargo due to reduced delays, (d) generates a safety benefit by giving air traffic control more time to re-vector aircraft, and (e) pays for itself by creating a greater added revenue and cost savings than it takes to implement it.

Although examples have been described in which a wind prediction system is combined with an air traffic management system, wind direction and/or speed forecasts as described herein may also be incorporated into wind turbine systems. For example, finely sampled wind measurements over large spatial areas in real-time (e.g., by WindTracer® systems), can be used to produce 3-D wind fields that can be used to produce highly accurate forecasts of future wind speeds at the locations of turbines and wind turbine power output. These forecasts are highly accurate because they are based on detailed measurements of wind speeds and directions across large volumes in the vicinity of the turbines. The future wind speed forecasts may be derived from a 3-D wind field sampled with arbitrary resolution and repetition in the three spatial dimensions and in time.

A wind prediction system for a wind turbine or wind turbine system derives a wind speed forecast and wind turbine power output forecast from the complete set of available wind measurements in a 3-D wind field.

As in the example of wind prediction systems for air traffic control, because these wind prediction systems for wind turbine systems rely on wind measurements to derive the future wind state, the prediction systems disclosed herein are more accurate than traditional numerical weather models that rely on coarsely sampled measurements of atmospheric parameters (e.g., atmospheric temperature, pressure, humidity, and weather front geometry) and in some cases extremely coarsely sampled wind measurements (e.g., single point measurements from anemometers or vertical wind profilers). Further, the wind prediction systems for wind turbine systems as disclosed herein forecast wind speeds based on a simple physical principle—conservation of momentum in an incompressible fluid—and thereby avoid the computational complexity of advection calculations often used in numerical weather models. The avoidance of computational complexity enables the prediction systems to generate forecasts with great computing speed, enabling real-time derivation of the future wind state from current measurements of the 3-D wind field.

A reference to an element in the singular is not intended to mean one and only one unless specifically so stated, but rather one or more. For example, a clock signal may refer to one or more clock signals, a control signal may refer to one or more control signals, an input signal may refer to one or more input signals, an output signal may refer to one or more output signals, and a signal may refer to differential voltage signals.

Unless specifically stated otherwise, the term some refers to one or more. Pronouns in the masculine (e.g., his) include the feminine and neuter gender (e.g., her and its) and vice versa. Headings and subheadings, if any, are used for convenience only and do not limit the invention.

The word exemplary is used herein to mean serving as an example or illustration. Any aspect or design described herein as exemplary is not necessarily to be construed as preferred or advantageous over other aspects or designs. In one aspect, various alternative configurations and operations described herein may be considered to be at least equivalent.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain. In one aspect, some of the dimensions are for clarity of presentation and are not to scale.

In one aspect, a term coupled, or the like, may refer to being directly coupled. In another aspect, a term coupled, or the like, may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

A phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

In one or more aspects, the terms "substantially", "about", and "approximately" may provide an industry-accepted tolerance for their corresponding terms and/or relativity between items. Such an industry-accepted tolerance may range from less than one percent to, for example, 10 percent.

Various items may be arranged differently (e.g., arranged in a different order, or partitioned in a different way) all without departing from the scope of the subject technology. In one aspect of the disclosure, the elements recited in the accompanying claims may be performed by one or more modules or sub-modules.

A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer systems such as wind forecast system 120 and/or air traffic management system 132 may include input devices such as a keyboard and a pointing device, e.g., a mouse or a trackball, by which a user can provide input to the computer system. Other kinds of input devices can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices that may be included in a computing system may include display devices, such as a LCD (liquid crystal display) monitor, for displaying information to the user.

According to one aspect of the present disclosure, wind forecast system 120 can be implemented using a computer system by one or more processors executing one or more sequences of one or more instructions contained in a memory. Such instructions may be read into memory from another machine-readable medium, such as data storage device. Execution of the sequences of instructions contained in the memory causes the processor to perform the processes described herein. One or more processors in a multi-processing arrangement may also be employed to execute the sequences of instructions contained in the memory. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system (e.g., wind forecast system 120 and ATM system 132) can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

The term "machine-readable storage medium" or "computer readable medium" as used herein refers to any medium or media that participates in providing instructions to one or more processors for execution. Such a medium may take many forms, including, but not limited to, non-volatile media, volatile media, and transmission media. Non-volatile media include, for example, optical or magnetic disks. Volatile media include dynamic memory. Transmission media include coaxial cables, copper wire, and fiber optics, including the wires that comprise a computer bus. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

The disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using a phrase means for or, in the case of a method claim, the element is recited using the phrase step for. Furthermore, to the extent that the term include, have, or the like is used, such term is intended to be inclusive in a manner similar to the term comprise as comprise is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed.

What is claimed is:

1. A system, comprising:
   at least one wind sensor configured to sample wind vectors for a plurality of parcels of air within a volume at a measurement time; and
   at least one processor configured to:
   propagate the sampled wind vectors for each of the plurality of parcels of air from the measurement time to a prediction time;
   identify a subset of the propagated wind vectors that are within a region of interest associated with an airport runway at the prediction time;
   combine the subset of propagated wind vectors to determine a predicted prevailing wind vector in the region of interest at the prediction time;
   identify a new runway configuration based on the predicted prevailing wind vector;
   obtain aircraft data associated with at least one aircraft approaching the airport runway; and generate a runway reconfiguration command for reconfiguration of the airport runway from a current runway configuration to the new runway configuration at a reconfiguration time that is based on the obtained aircraft data.

2. The system of claim 1, wherein the at least one wind sensor comprises a lidar sensor.

3. The system of claim 2, wherein the at least one wind sensor further comprises a radar sensor.

4. The system of claim 3, wherein the at least one wind sensor further comprises an anemometer and a vane sensor.

5. The system of claim 1, further comprising an air traffic management system, and wherein the at least one processor is configured to provide the generated runway reconfiguration command to the air traffic management system.

6. The system of claim 5, wherein the air traffic management system is configured to:
 generate at least one updated landing pattern for the at least one approaching aircraft based on the runway reconfiguration command and a position of the at least one approaching aircraft; and
 provide the at least one updated landing pattern to the at least one approaching aircraft.

7. The system of claim 6, wherein the at least one approaching aircraft includes a first set of approaching aircraft scheduled to arrive before the reconfiguration time and a second set of approaching aircraft scheduled to arrive after the reconfiguration time, and wherein the air traffic management system is configured to generate an updated landing pattern for each of the second set of approaching aircraft.

8. The system of claim 1, wherein the at least one processor is configured to propagate the sampled wind vectors for each of the plurality of parcels of air from the measurement time to the prediction time using an advection model.

9. The system of claim 1, wherein the at least one processor is configured to propagate the sampled wind vectors for each of the plurality of parcels of air from the measurement time to the prediction time while maintaining incompressibility of the air.

10. The system of claim 1, wherein the region of interest is a one cubic kilometer region and wherein the volume is substantially larger than the region of interest.

11. A method, comprising:
 obtaining wind vector samples for a plurality of parcels of air at a measurement time;
 propagating the sampled wind vectors for each of the plurality of parcels of air from the measurement time to a prediction time;
 identifying a subset of the propagated wind vectors that are within a region of interest associated with an airport runway at the prediction time;
 combining the subset of propagated wind vectors to determine a predicted prevailing wind vector in the region of interest at the prediction time;
 identifying a new runway configuration based on the predicted prevailing wind vector;
 obtaining aircraft data associated with at least one aircraft approaching the airport runway; and
 generating a runway reconfiguration command for reconfiguration of the airport runway from a current runway configuration to the new runway configuration at a reconfiguration time that is based on the obtained aircraft data.

12. The method of claim 11, wherein obtaining the wind vector samples comprises obtaining the wind vector samples with a lidar sensor.

13. The method of claim 12, wherein each wind vector comprises a wind speed and a wind direction for a corresponding parcel, and wherein propagating the sampled wind vectors comprises tracking a position of each parcel as the parcel moves at the wind speed along the wind direction of the wind vector corresponding to that parcel.

14. The method of claim 11, wherein obtaining the wind vector samples comprises obtaining the wind vector samples with a 100 meter resolution within a disk shaped volume of air approximately 15 km in radius and extending from ground to about 5 km altitude.

15. The method of claim 11, wherein the prediction time is less than sixty minutes after the measurement time.

16. A system, comprising:
 a lidar sensor configured to sample wind vectors for a plurality of parcels of air within a volume; and
 computing equipment configured to:
  receive the sampled wind vectors from the lidar sensor;
  propagate the sampled wind vectors forward in time;
  identify a subset of the propagated wind vectors that intercept a region of interest;
  identify an arrival time at the region of interest for each of the subset of propagated wind vectors;
  bin the subset of the propagated wind vectors based on the identified arrival times; and
  identify a prevailing wind vector for the region of interest for each bin of the binned subset of the propagated wind vectors, based on the propagated wind vectors in that bin.

17. The system of claim 16, wherein each bin corresponds to a predicted time that is after a measurement time at which the wind vectors are sampled by the lidar sensor.

18. The system of claim 16, wherein the computing equipment is further configured to identify a runway configuration and a reconfiguration time based on the identified prevailing wind vectors.

19. The system of claim 16, wherein the region of interest is a volume of air associated with an airport or a wind turbine.

20. The system of claim 16, wherein the computing equipment is further configured to apply a persistence model to the binning of the subset of the propagated wind vectors based on the identified arrival times.

* * * * *